Sept. 28, 1937.  J. J. MASCUCH  2,094,329
BATTERY CONTAINER
Filed Nov. 21, 1933  2 Sheets-Sheet 1
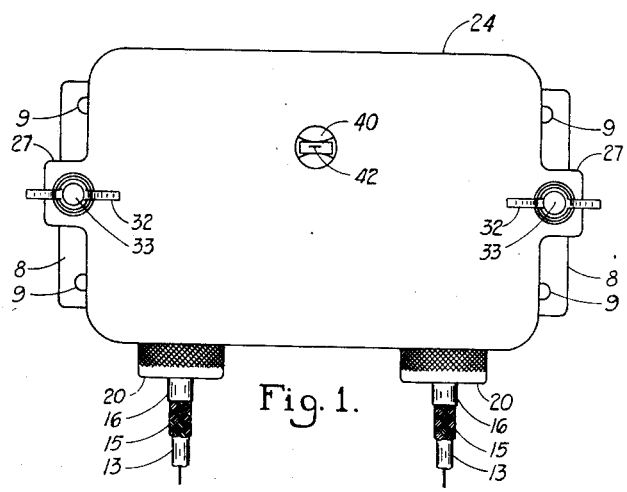
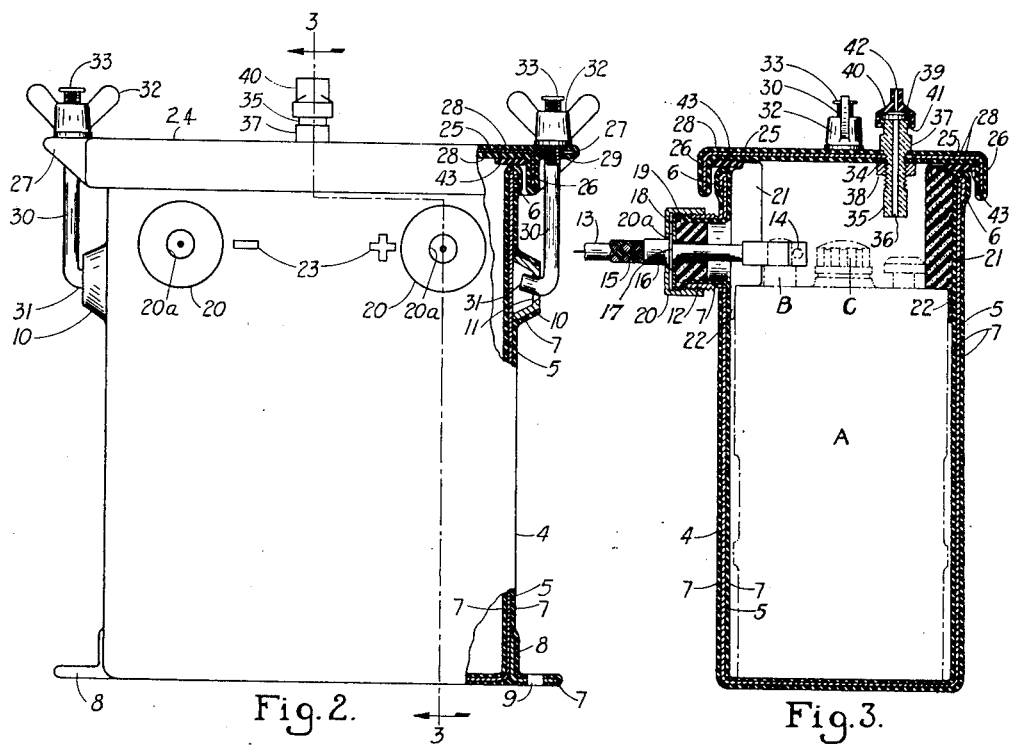
INVENTOR.
JOSEPH. J. MASCUCH.
BY C. C. Cousins
ATTORNEY.

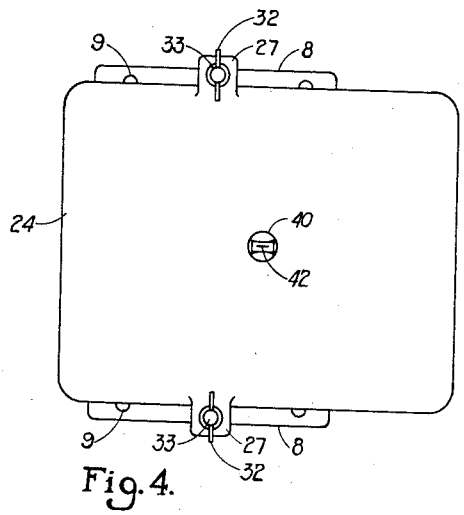
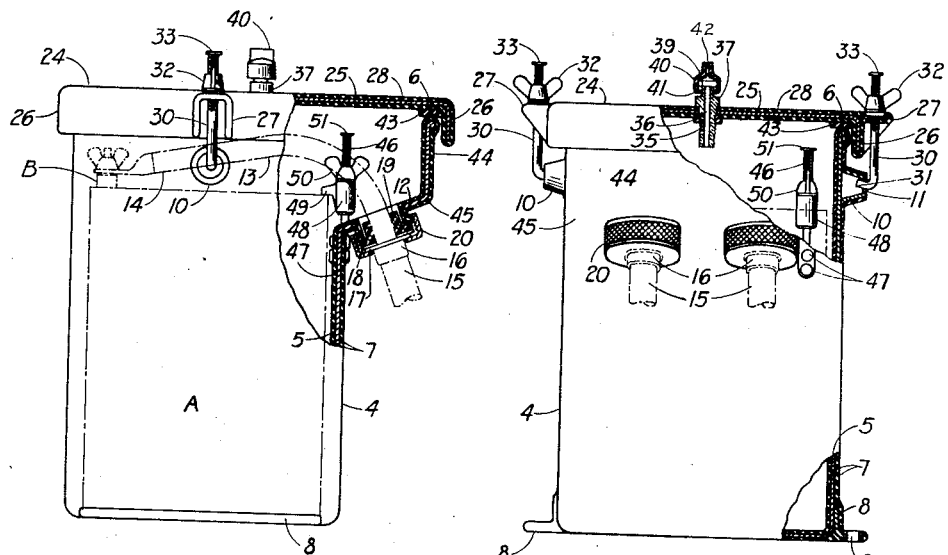

Patented Sept. 28, 1937

2,094,329

UNITED STATES PATENT OFFICE 2,094,329

BATTERY CONTAINER

Joseph J. Mascuch, Newark, N. J.

Application November 21, 1933, Serial No. 698,995

1 Claim. (Cl. 136—166)

This invention relates to a battery container or case.

In aircraft practice the storage battery on the airplane is not always maintained in an upright position. During the flight of an airplane the battery may be tilted from side to side or even completely inverted as when the plane is turned over in a loop or back dive. Under these conditions the acid solution in the battery is spilled, resulting in damage to the adjacent elements which the acid may contact. Therefore, one object of this invention is to provide a completely enclosed battery container which will prevent spilling of acid from the battery on the adjacent parts of an airplane. A further object of this invention is to provide a container or case for the battery which will not be affected by acid spilled from the battery.

Many accidents have occurred by reason of explosions of batteries. The constant shaking of the battery produces gases, which, if not released, may cause an explosion. Therefore, a further object of the invention is to provide an airtight container having a vent therein to permit the release of gases but to prevent the releases of acid and to prevent the admission of water or other foreign matter into the container.

Where a connection becomes loose or partially worn improper electrical emanations may be released, which affect radio equipment on the airplane. Therefore, a further, specific object of this invention is to provide a grounded, conductive housing to entirely surround the battery and which will absorb and ground any electrical emanations improperly released from the battery, and which will also absorb and ground any impulses coming from the outside which might adversely affect the battery.

In view of the danger of spilling it is customary to place the battery in an upright position. To do this often necessitates placing the battery in such a location that it is necessary to entirely remove the battery and container from the airplane to inspect or service the battery. Therefore, a further object of this invention is to provide a battery container which may be connected in any position on the airplane so that the battery may be inspected or serviced without removing it from the airplane.

A further object of the invention is to provide a container so constructed that the battery cables may be readily withdrawn from the container and the battery removed therefrom without removing the container from the airplane.

A further object of the invention is to provide a container which will yieldingly hold the battery in position and prevent damage to the battery by reason of relative movement inside the container.

The invention herein is described in connection with its use in airplanes, for which it is particularly adapted, but it will be obvious that this battery container may be used with any storage battery on any structure.

The invention consists of the construction, combination and arrangement of parts as herein illustrated, described and claimed.

In the accompanying drawings, forming part hereof, is illustrated one form of embodiment of the invention, in which drawings similar reference characters designate corresponding parts, and in which:

Figure 1 is a top plan view of the battery case with a portion of the conducting cables;

Figure 2 is a side elevation, partly broken away;

Figure 3 is a vertical section on line 3—3 of Figure 2, looking in the direction indicated by the arrows, the battery being shown in outline;

Figure 4 is a plan view of a modified form of container;

Figure 5 is an end elevation, partly in section, of the structure shown in Figure 4; and Figure 6 is a side elevation, partly in section, of the structure shown in Figure 4.

Referring to the drawings, A designates a battery having the usual binding post connection B and inspection-opening cap C. 4 designates the container or case generally. The case 4 comprises an open-ended metal shell or housing 5, which may be made of a single piece or may be made of sheets brazed or otherwise connected together. Various metals may be used for the housing 5 but aluminum or stainless steel is preferable. The upper edge of the housing 5 is turned over as shown at 6 to form a seat to receive a closure hereinafter described. On the outside and inside of the housing 5 is disposed a covering of rubber or other acid-resistant compound 7. The rubber covering 7 may be applied by dipping the housing 5; it may be applied in thin sheets and vulcanized; it may be applied by spraying in liquid form or the covering 7 may be applied in any other desirable manner.

Secured at the base of the container 4, before the covering 7 is applied thereto, is a plurality of angle irons 8, which may be welded or otherwise suitably affixed to the container 4. The angle irons 8 are provided with openings 9 through which may be disposed bolts or other fastening means to hold the container 4 in position on any desired portion of the airplane. On each end of the container 4 at a point below the top thereof is disposed a hollow boss 10 having a central opening 11. The bosses 10, which are applied before the rubber covering 7, may be secured to the container by welding or any other suitable means.

On one side of the container 4 are disposed a plurality of screw-threaded outlets 12 to permit the passage of an insulated conductor or cable 13. The cable 13 is provided with the usual connecting means 14 for making connection with the binding post B of the battery A. Disposed around the cable 13 on the outside of the container 4 is a protective housing or conduit 15 of any suitable structure but preferably a conduit such as is shown in my co-pending application Serial No. 657,167 now Patent No. 2,028,793, granted January 28, 1936. On the end of the conduit 15 is disposed a ferrule 16 provided with an annular flange 17. Around the cable 13 and adjacent the flange 17 is a metal washer 18. Around the cable 13 and adjacent the washer 18 is a flanged sponge-rubber packing 19. A collar nut 20 having a central opening 20—a therein is disposed over the conduit 15 and the ferrule 12. The nut 20 bears against the flange 17 which in turn bears against the washer 18. The packing 19 is compressed and forced into the outlet 12. When the nut 20 is tightened, the packing 19, being compressed, holds the conductor 13 tightly in place and at the same time makes a fluid-tight seal so that no acid can escape through the outlet 12. The flange on the packing 19 is gripped between the end of the outlet 12 and the washer 18 to prevent the packing 19 being forced entirely through the outlet 12. The inner end of the packing 19 may be tapered to assist in entering the packing 19 in the outlet 12.

At the same time a continuous electrical bond is made from the metal 5 through the outlet 12, the nut 20, the ferrule 16 and the conduit 15, which conduit 15 is grounded to another portion of the airplane so that a completely grounded electrical shield is provided for the battery. The bolts disposed through the openings 9 at the base of the container serve as an additional ground since they are in contact with the angle irons 8 which contact the metal 5 of the container 4.

With this construction, when the nut 20 is removed it is possible to withdraw the conductor 12 and the connection 14 entirely from the container 4 so that the battery A may be removed therefrom without difficulty. It should be noted that on some large types of batteries the binding post B may not be opposite the outlets 12. In this event, the battery is placed in the container with the binding post on the opposite side from the outlets 12 and a longer cable is used so that the cable 13 may be bent within the container 4 to fit the binding post B. With this construction only two or three standard sizes of containers 4 are necessary to accommodate any known type of storage battery.

To hold the battery A in position a plurality of sponge-rubber blocks 21 may be disposed in the container 4 between the top of the battery A and the covering hereinafter described. The blocks 21 are provided with the wedge-shaped extensions 22 adapted to be forced between the battery A and the sides of the container 4 to absorb any vibration and prevent movement of the battery A. On the outside of the container 4, adjacent the outlets 12, suitable indicia 23 may be shown. The indicia 23 may be cut in the outer covering 7 or otherwise suitably shown on the container 4 to indicate the positive and negative poles of the battery A.

Disposed over the container 4 is a cover or closure designated generally as 24. The cover 24 comprises a sheet of metal 25 similar to the metal 5 of the container 4. Dependent flanges 26 are provided on the side and ends of the sheet 25. On the ends of the sheet 25 are disposed re-inforced extensions 27 which may be secured to the sheet 25 and the flanges 26 by welding or other suitable means. A covering of rubber or other acid-resistant compound 28 is disposed on the inside and outside of the sheet 25, the flanges 26 and the extensions 27. The rubber covering 28 may be applied in like manner as the covering 7 of the container 4.

In each extension 27 is an opening 29 through which is disposed a threaded rod 30. The rod 30 is provided on its lower end with an angular extension 31 which may be formed by merely bending the rod 30 upon itself. The extension 31 is adapted to be entered in the opening 11 in the boss 10. Carried on the threaded upper end of the rod 30 is a wing-nut 32 and the rod 30 is provided with a head 33 to prevent the removal of the nut 32. When it is desired to apply the cover 24 to the container 4 the nuts 32 are loosened permitting free movement of the rod 30 in the opening 29. The extensions 31 on the rod 30 are entered in the openings 11 of the bosses 10 and the nuts 32 tightened, which draws the rod 30 upward, thus securely fastening the cover 24 to the container 4. On the inside of the cover 24 adjacent the edge thereof is disposed a continuous rubber gasket 43 adapted to lie between the upper edge of the container 4 and the under side of the cover 24 so that when the cover 24 is tightened down on the container 4 an air-tight and liquid-tight closure is effected.

When it is desired to remove the cover 24 the nuts 32 are loosened, permitting the removal of the extensions 31 of the rod 30 from the openings 11 so that the cover 24 is free to be lifted. The angle of the extensions 31 on the rod 30 is such that the rod 30 cannot be withdrawn through the openings 29 in the extension 27. At the same time the head 33 prevents the removal of the nut 32. Therefore, when the cover 24 is removed neither the rod 30 nor the nut 32 can be lost by being separated from the cover 24.

In the cover 24 is an opening 34 through which is disposed a threaded vent 35 having a bore 36. The vent 35 is provided with a shoulder 37 adapted to rest on the covering 28 on the outside of the cover 24. The vent 35 is held in place by a nut 39 applied from the inside of the cover 24. The top of the vent 35 is provided with a head 38 adapted to receive a soft rubber nipple or valve 40 which is provided with an internal flange 41 adapted to engage around the vent 35 under the head 38. The nipple 40 is provided with a slit 42 to permit the passage of gases from within the cover 24 to the outside. However, the nipple 40 will not permit water or any other matter to enter the cover 24 from the outside. At the same time, the acid solution of the battery A, in the event there is leakage, cannot pass through the bore 36 or the opening 42. In the event the battery A was completely inverted and there was leakage of the acid solution the level of such liquid would be below the end of the bore 36 in the inverted position, so that no leakage would be possible. In any event, there could be no leakage through the opening 42 unless there was pressure from within as in the case when gases are permitted to escape.

It often occurs that the battery is placed in such a position in the airplane that the conductor 13 will be led to the battery from a point below the container 4. In this event it is necessary to have a sharp bend in the conductor 13, in order to enter the outlet 12. It is not desirable to have a sharp bend in the conductor 13 at any point and in the case of heavy conductors it is impossible to bend the conductor at a sharp angle.

The construction shown in Figures 4, 5, and 6, therefore, is provided for use where the conductor 13 is led to the container 4 from a point below the container 4. As shown in Figures 5 and 6, the container 4 is provided with a lateral extension 44, the bottom 45 of which is set at an angle to the base of the container 4. The outlets 12 are secured to the bottom 45 so that it is not necessary for the conductor 13 or the housing 15 to describe a sharp bend to enter the casing 4 through the outlet 12.

When this construction is used the binding post B of the battery A is placed on the opposite side of the container 4 from the extension 44. In this way the conductor 13 is led through the outlet 12 and curved over the battery A so that the connection 14 may be secured to the binding post B. When it is desired to remove the battery the connection 14 and the nut 20 are removed and the cable 13 may be entirely withdrawn from the casing, as heretofore described.

When the construction shown in Figures 4, 5, and 6 is used, it is not necessary to use the blocks 21 to hold the battery in place. In order to secure the battery A against movement within the container 4, a threaded rod 46 is secured to the casing 4 by means of rivets or other suitable means 47. A sleeve 48 is movably carried on the rod 46 and is provided with a projecting finger 49 adapted to extend over the top of the battery A. A wing nut 50 is provided so that the finger 49 of the sleeve 48 may be tightened against the battery A, thus holding it securely in position. A head 51 is formed on the rod 46 after the sleeve 48 and the nut 50 have been applied, so that the nut 50 cannot be accidentally removed and lost from the rod 46.

When it is desired to remove the battery A from the container 4, the nut 50 is loosened and the sleeve 48 rotated on the rod 46 sufficient to remove the finger 49 from the path of movement of the battery A. The battery A is then free to be lifted from the casing 4. A plurality of holding means as described may be used so as to provide several points of contact to insure that the battery is held in position.

From the foregoing it will be seen that an acid-proof container is provided for the battery so that leakage from the battery will not affect the surrounding parts. It should also be noted that the rod 30 makes electrical contact with the metal 25 of the cover 24 in passing through the opening 29, and this contact is continued by the extension 31 and the boss 10, so that the container is completely shielded. It is pointed out that where the rubber coverings 7 or 28 are applied by dipping, the openings 9, 11, and 29 and the threads on the outlet 12 are thereafter cleaned so that the various metal portions constituting the continuous electrical conductor will make good contact.

It will be seen further that the container 4 and the battery A need not be applied to the airplane in a normal upright position, since no leakage of the acid from the container 4 is possible, regardless of the position of the battery A, and the container itself is impervious to the action of the acid. At the same time the blocks 21, or the finger 49 in the modified form, will maintain the battery in position regardless of vibration or jolts.

Having thus fully described the invention, what is claimed as new and desired to be secured by Letters Patent is:

A radio shielded battery container comprising a metal casing covered on the inside and outside with an acid resistant coating, a metal cover to close the container coated on both sides with an acid resistant covering, means to ground the cover to the casing, means to ground the casing to a vehicle, means disposed wholly within the casing to prevent movement of a battery, outlets formed on the casing to permit the passage of conductors and to receive the end of a flexible conduit surrounding a conductor and means to form a liquid tight connection at the outlets comprising a flanged, compressible packing insertable in the outlet, a rigid packing adjacent the compressible packing and a coupling nut to seal the flange of the compressible packing between the rigid packing and the edge of the outlet.

JOSEPH J. MASCUCH.